US008461228B2

United States Patent
Yasuda

(10) Patent No.: US 8,461,228 B2
(45) Date of Patent: Jun. 11, 2013

(54) INK COMPOSITION, INK SET AND IMAGE FORMING METHOD

(75) Inventor: Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 55 days.

(21) Appl. No.: 13/043,498

(22) Filed: Mar. 9, 2011

(65) Prior Publication Data

US 2011/0229641 A1  Sep. 22, 2011

(30) Foreign Application Priority Data

Mar. 17, 2010  (JP) .................................. 2010-061100

(51) Int. Cl.
| | | |
|---|---|---|
| *A61K 47/48* | (2006.01) | |
| *B01F 3/04* | (2006.01) | |
| *B05D 1/36* | (2006.01) | |
| *B05D 5/00* | (2006.01) | |
| *B41F 31/00* | (2006.01) | |
| *B41J 2/01* | (2006.01) | |
| *B41J 2/17* | (2006.01) | |
| *B41J 2/175* | (2006.01) | |
| *C08F 2/00* | (2006.01) | |
| *C08F 2/46* | (2006.01) | |
| *C08F 20/00* | (2006.01) | |
| *C08F 22/36* | (2006.01) | |
| *C08F 122/36* | (2006.01) | |
| *C08F 126/06* | (2006.01) | |
| *C08F 226/06* | (2006.01) | |
| *C08F 222/36* | (2006.01) | |
| *C08G 18/67* | (2006.01) | |
| *C08G 61/12* | (2006.01) | |
| *C08J 7/04* | (2006.01) | |
| *C09D 5/00* | (2006.01) | |
| *C09D 11/00* | (2006.01) | |
| *G01D 11/00* | (2006.01) | |

(52) U.S. Cl.
USPC ................ 523/160; 101/491; 347/1; 347/85; 347/95; 347/100; 427/256; 427/258; 427/511; 522/167; 522/173; 522/174; 522/175; 522/186; 522/161; 526/258; 526/298; 526/303.1; 526/306; 526/307

(58) Field of Classification Search
USPC .................. 523/160, 161; 522/167, 173, 174, 522/175, 186; 526/258, 298, 303.1, 306, 526/307; 347/1, 85, 95, 100; 101/491; 427/256, 427/258, 511
See application file for complete search history.

(56) References Cited

U.S. PATENT DOCUMENTS 5,563,214 A * 10/1996 Share et al. .................... 524/809
6,017,660 A *  1/2000 Palazzotto et al. .............. 430/17

FOREIGN PATENT DOCUMENTS

| EP | 1739141 A1 | 1/2007 |
|---|---|---|
| JP | 2007-314611 A | 12/2007 |
| JP | 2007314610 A | 12/2007 |
| WO | 2008/123478 A1 | 10/2008 |

OTHER PUBLICATIONS

Corresponding EPO Official communication, Jul. 5, 2011.

* cited by examiner

*Primary Examiner* — Patrick Niland
(74) *Attorney, Agent, or Firm* — SOLARIS Intellectual Property Group, PLLC

(57) ABSTRACT

The invention provides an ink composition including a polymerizable compound represented by following Formula (1), a polymerization initiator and water:

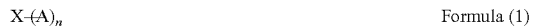

Formula (1)

wherein, in Formula (1), X represents a divalent or trivalent nitrogen-containing linking group represented by any one of following Formulae (X1) to (X3), A represents a polymerizable functional group having an amide group, and n represents 2 or 3:

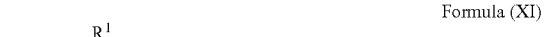

Formula (X1)

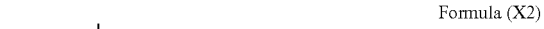

Formula (X2)

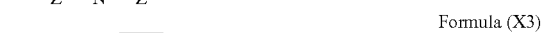

Formula (X3)

wherein, in Formulae (X1) to (X3), Z represents an alkylene group having 2 or 3 carbon atoms, or a divalent linking group including an alkylene group having 2 or 3 carbon atoms and an oxygen atom; and $R^1$ represents a hydrogen atom or an alkyl group having 1 to 4 carbon atoms.

11 Claims, No Drawings

INK COMPOSITION, INK SET AND IMAGE FORMING METHOD

CROSS-REFERENCE TO RELATED APPLICATION

This application claims priority under 35 USC 119 from Japanese Patent Application No. 2010-061100 filed Mar. 17, 2010, the disclosure of which is incorporated by reference herein.

BACKGROUND OF THE INVENTION

1. Technical Field

The invention relates to an ink composition, an ink set and an image forming method using the ink composition or the ink set.

2. Related Art

In recent years, with the increasing need for resource preservation, environment conservation, improvement in operation stability and the like, there has been a shift to aqueous paints and inks (hereinafter, also referred to as inks). As a means for improving the fixability of printed images formed from aqueous inks, for example, use of ultraviolet-curable aqueous inks has been conventionally known.

As water-soluble polymerizable compounds that may be used for such ultraviolet-curable aqueous inks, polymerizable compounds including a long-chain alkylene oxy group have been known (see, for example, Japanese Patent Application Laid-Open (JP-A) No. 2007-314611).

However, when ultraviolet-curable aqueous inks are produced by using conventional compounds such as the polymerizable compounds described in JP-A No. 2007-314611, it has been difficult to obtain satisfactory curing sensitivity.

The present invention has been made in consideration of the above problems, and aims to provide an aqueous ink composition and an ink set that exhibit superior curing sensitivity, and an image forming method using the ink composition and the ink set.

SUMMARY

An aspect of the invention provides an ink composition including a polymerizable compound represented by following Formula (1), a polymerization initiator and water:

$$X-(A)_n \quad \text{Formula (1)}$$

wherein, in Formula (1), X represents a divalent or trivalent nitrogen-containing linking group represented by any one of following Formulae (X1) to (X3), A represents a polymerizable functional group having an amide group, and n represents 2 or 3.

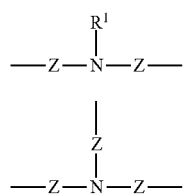

Formula (XI)

Formula (X2)

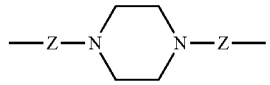

Formula (X3)

wherein, in Formulae (X1) to (X3), Z represents an alkylene group having 2 or 3 carbon atoms, or a divalent linking group including an alkylene group having 2 or 3 carbon atoms and an oxygen atom; and $R^1$ represents a hydrogen atom or an alkyl group having 1 to 4 carbon atoms.

DETAILED DESCRIPTION OF THE INVENTION

The aqueous ink composition of the present invention (hereinafter, also referred to as an "ink composition") includes at least one kind of polymerizable compound represented by Formula (1) described below, at least one kind of polymerization initiator and water. As necessary, the ink composition may further include a colorant (preferably a pigment), a water-soluble organic solvent, and other additives.

The ink composition of the present invention contains a polymerizable compound, which is represented by Formula (1) described below and has two or three polymerizable functional groups that are linked via a nitrogen-containing linking group having an aliphatic amino group. Therefore, for example, when the ink composition is applied onto a recording medium and exposed to actinic energy rays, it cures with excellent curing sensitivity.

The ink composition of the invention may be used not only for forming a single-color image, but also for forming a multicolor image (for example, a full-color image), by selecting one or more of desired colors. In the case of forming a multicolor image, the ink composition can be used as, for example, a magenta ink, a cyan ink, or a yellow ink. Further, in order to adjust the color tone, the ink composition may be used as a black ink.

Moreover, the ink composition of the invention can be used as an ink composition having a color other than yellow (Y), magenta (M) and cyan (C), such as red (R), green (G), blue (B) or white (W), or as an ink composition for a spot color used in the field of printing.

The ink composition of various colors can be prepared by changing the colorant (for example, a pigment) as desired.

(Polymerizable Compound)

The ink composition of the present invention contains at least one kind of water-soluble polymerizable compound (hereinafter, also referred to as a "specific polymerizable compound") represented by Formula (1) described below.

In the present specification, the term "water-soluble" means that the specific polymerizable compound dissolves in distilled water at 25° C. at a proportion of 2% by mass or more, but the specific polymerizable compound is preferably a compound that dissolves in distilled water at a proportion of 5% by mass or more, more preferably a compound that dissolves at a proportion of 10% by mass or more, even more preferably a compound that dissolves at a proportion of 20% by mass or more, and particularly preferably a compound that is homogeneously mixed with water at any desired proportion.

The polymerizable compound used in the present invention is a water-soluble polymerizable compound represented by the following Formula (1), the compound including a specific amine structure represented by any one of Formula (X1) to Formula (X3) described below and two or three polymerizable functional groups each having an amide group. Specifically, since the specific polymerizable compound has an amine structure in the molecule thereof, it exhibits excellent curing sensitivity. The reason for this is thought to be that, for example, the specific amine structure effectively suppresses inhibition of radical polymerization due to oxygen, thereby increasing the polymerization rate. In addition, inclusion of the specific amine structure results in improved water solubility.

$$X\text{-}(A)_n \qquad \text{Formula (1)}$$

In Formula (1), X represents a divalent or trivalent nitrogen-containing linking group represented by any one of following Formulae (X1) to (X3), A represents a polymerizable functional group having an amide group, and n represents 2 or 3.

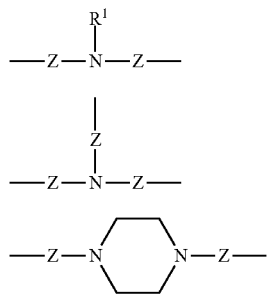

In Formulae (X1) to (X3), Z represents an alkylene group having 2 or 3 carbon atoms, or a divalent linking group including an alkylene group having 2 or 3 carbon atoms and an oxygen atom; and $R^1$ represents a hydrogen atom or an alkyl group having 1 to 4 carbon atoms.

The two or three of Z in Formula (X1) to Formula (X3) may be the same or different from each other.

In the case in which Z represents a divalent linking group including an alkylene group having 2 or 3 carbon atoms and an oxygen atom, Z is preferably a divalent linking group formed from at least one alkyleneoxy group having 2 or 3 carbon atoms and an alkylene group having 2 or 3 carbon atoms, and more preferably a divalent linking group formed from one or two alkyleneoxy groups each having 2 or 3 carbon atoms and an alkylene group having 2 or 3 carbon atoms.

In the present invention, from the viewpoints of curing sensitivity and water solubility, Z is preferably an alkylene group having 2 or 3 carbon atoms, or a divalent linking group formed from one or two alkyleneoxy groups each having 2 or 3 carbon atoms and an alkylene group having 2 or 3 carbon atoms, more preferably an alkylene group having 2 or 3 carbon atoms, an ethyleneoxyethylene group, or a diethyleneoxyethylene group, and even more preferably an alkylene group having 2 or 3 carbon atoms.

$R^1$ represents a hydrogen atom or an alkyl group having from 1 to 4 carbon atoms. Specific examples of the alkyl group include a methyl group, an ethyl group, an n-propyl group, an i-propyl group, an n-butyl group, an i-butyl group, and a t-butyl group.

In the present invention, from the viewpoints of curing sensitivity and water solubility, $R^1$ is preferably a methyl group, an ethyl group, an n-propyl group, or an i-propyl group, and more preferably a methyl group or an ethyl group.

In Formula (1), A represents a polymerizable functional group having an amide group. The polymerizable functional group is not particularly limited, and any commonly used polymerizable functional group can be used as long as it has an amide group. It should be noted that the amide group mentioned herein is not limited to carboxylic acid amides but includes an imide group, a sulfonamide group, and the like.

In the present invention, from the viewpoint of curing sensitivity, the polymerizable functional group represented by A is preferably a polymerizable functional group represented by any one of following Formula (A1) to Formula (A4).

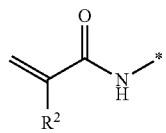

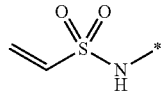

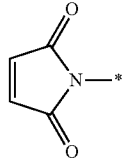

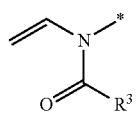

In Formulae (A1) to (A4), $R^2$ represents a hydrogen atom or an alkyl group. The alkyl group may be any one of a straight-chain, branched, or cyclic alkyl group, and may have a hydrophilic substituent such as a hydroxyl group or an alkoxy group having from 1 to 4 carbon atoms.

Further, the alkyl group preferably has from 1 to 12 carbon atoms, more preferably from 1 to 8 carbon atoms, and particularly preferably from 1 to 4 carbon atoms.

Specific examples of the alkyl group represented by $R^2$ include a methyl group, an ethyl group, a propyl group, an n-butyl group, an i-butyl group, a t-butyl group, an n-hexyl group, a cyclohexyl group, a 2-hydroxyethyl group, a 3-hydroxypropyl group, a 2-hydroxypropyl group, a 2-methoxyethyl group, and a 2-t-butoxyethyl group.

In the present invention, from the viewpoint of polymerization reactivity, $R^2$ preferably represents a hydrogen atom or a methyl group, and particularly preferably a hydrogen atom.

In Formula (A4), $R^3$ represents an alkyl group which may have a substituent, or an aryl group which may have a substituent.

The alkyl group represented by $R^3$ is preferably an alkyl group having from 1 to 3 carbon atoms. Specific examples of the alkyl group represented by $R^3$ include a methyl group, an ethyl group, an n-propyl group, and an i-propyl group. In the present invention, from the viewpoint of curing sensitivity, the alkyl group represented by $R^3$ is preferably a methyl group or an ethyl group.

Further, the aryl group represented by $R^3$ is preferably an aryl group having from 6 to 10 carbon atoms. Specific examples of the aryl group represented by $R^3$ include a phenyl group and a naphthyl group. In the present invention, from the viewpoint of curing sensitivity, the aryl group represented by $R^3$ is preferably a phenyl group.

In a case in which the alkyl group or the aryl group represented by $R^3$ has a substituent, examples of the substituent include an alkyl group, an alkoxy group, a halogen atom, a hydroxyl group, and an amide group. Specific examples of the alkyl group as the substituent include a methyl group, an ethyl group, a propyl group and a butyl group. Specific examples of the alkoxy group include a methoxy group, an ethoxy group, a propoxy group, a butoxy group, an ethylenedioxy group, and a methylenedioxy group. Further, specific examples of the halogen atom include a fluorine atom, a chlorine atom, a bromine atom, and an iodine atom.

In the present invention, from the viewpoint of curing sensitivity, $R^3$ in Formula (A4) preferably represents a methyl group, an ethyl group, or a phenyl group, and more preferably a methyl group or an ethyl group.

The specific polymerizable compound has two or three polymerizable functional groups selected from the group consisting of polymerizable functional groups represented by Formula (A1) to Formula (A4). The two or three polymerizable functional groups in the specific polymerizable compound may be the same or different from each other, but in view of ease of synthesis, the polymerizable functional groups are preferably the same.

Above all, from the viewpoint of curing sensitivity, the specific polymerizable compound in the present invention preferably has two or three polymerizable functional groups selected from the group consisting of a (meth)acrylamide group represented by Formula (A1), a vinylsulfonamide group represented by Formula (A2), and a maleimido group represented by Formula (A3), and more preferably two or three (meth)acrylamide groups represented by Formula (A1).

From the viewpoint of curing sensitivity, in the specific polymerizable compound in the present invention, X is preferably a nitrogen-containing linking group represented by Formula (X1), Formula (X2) or Formula (X3) in which Z represents an alkylene group having 2 or 3 carbon atoms, an ethyleneoxyethylene group, or a diethyleneoxy ethylene group, and A represents a polymerizable functional group represented by any one of Formula (A1) to Formula (A3). It is more preferable that X represents a nitrogen-containing linking group represented by Formula (X1), Formula (X2) or Formula (X3) in which Z represents an alkylene group having 2 or 3 carbon atoms, and A represents a polymerizable functional group represented by Formula (A1). It is even more preferable that X represents a nitrogen-containing linking group represented by Formula (X2) in which Z represents an alkylene group having 2 or 3 carbon atoms, and A represents a polymerizable functional group represented by Formula (A1).

Specific examples of the specific polymerizable compound in the present invention are shown below, but the invention is not limited to these specific examples.

1
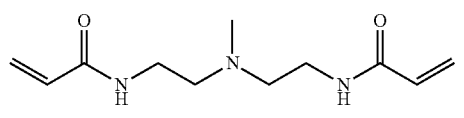

2
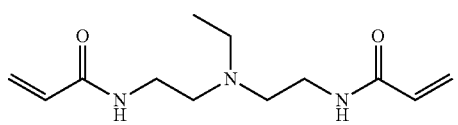

3
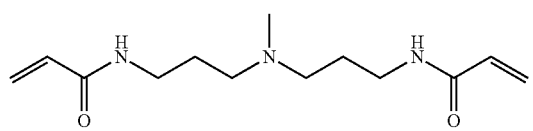

4
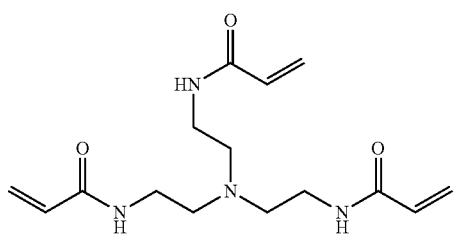

5
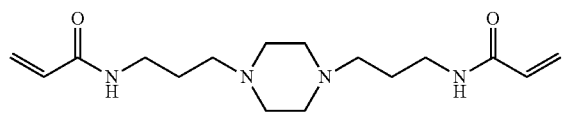

6
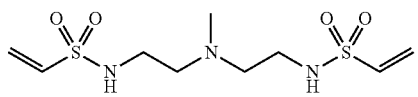

7
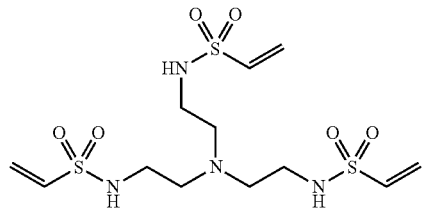

8
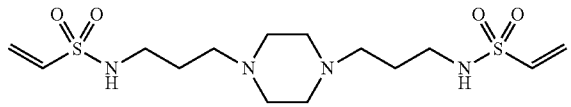

-continued

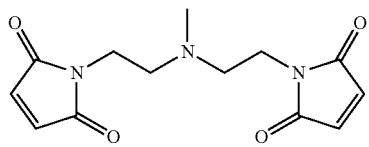
9

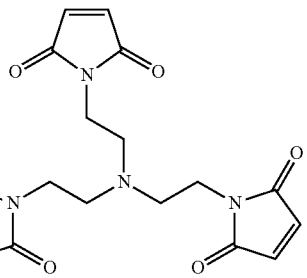
10

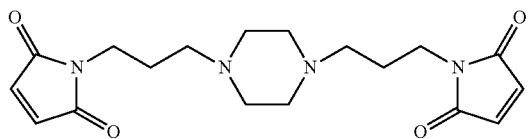
11

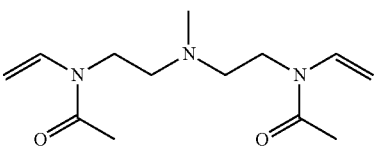
12

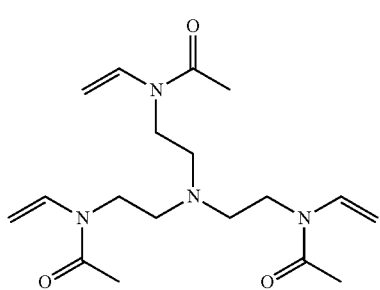
13

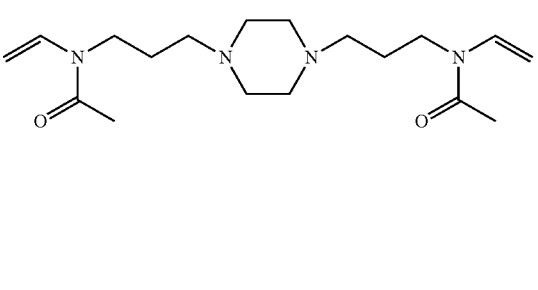
14

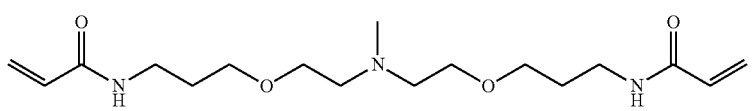
15

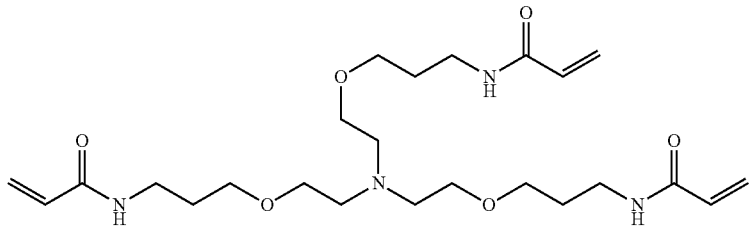
16

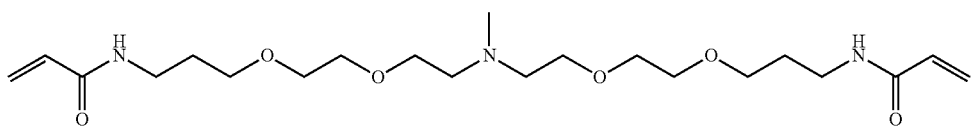
17

The content of the specific polymerizable compound in the ink composition of the present invention is preferably in a range of from 1% by mass to 50% by mass in terms of solid matter content, with respect to the total mass of the ink composition. The content of the specific polymerizable compound is more preferably in a range of from 1% by mass to 40% by mass, and even more preferably in a range of from 1% by mass to 30% by mass.

An additional polymerizable compound other than the specific polymerizable compound may be contained in the aqueous ink composition of the present invention, as long as the effect of the invention is not impaired.

The additional polymerizable compound may be any compound other than the specific polymerizable compound, as far as it is a polymerizable compound having an ethylenically unsaturated bond capable of radical polymerization, which is a compound having at least one ethylenically unsaturated bond capable of radical polymerization in the molecule thereof. The additional polymerizable compound may have a chemical form of, for example, a monomer, an oligomer, a polymer, or the like.

The additional polymerizable compound may be used alone, or two or more kinds thereof may be used in combination at any ratio for the purpose of improving the intended properties.

Exemplary polymerizable compounds having an ethylenically unsaturated bond include compounds capable of radical polymerization, such as unsaturated carboxylic acids including acrylic acid, methacrylic acid, itaconic acid, crotonic acid, isocrotonic acid, and maleic acid, salts thereof, and derivatives thereof; anhydrides having an ethylenically unsaturated group; acrylonitrile; styrene; and various kinds of unsaturated polyesters, unsaturated polyethers, unsaturated polyamides, and unsaturated urethanes.

Specific examples thereof include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloyloxy polyethoxy phenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N,N-dimethylamino acrylamide, N,N-dimethylaminoethyl acrylamide, N,N-dimethylaminopropyl acrylamide, and quaternized compounds thereof, N-methylolacrylamide, hydroxyethylacrylamide, hydroxypropylacrylamide, 4-acryloylmorpholine, N-[1,1-dimethyl-2-(sodiooxysulfonyl)ethyl]acrylamide, diacetone acrylamide, and epoxy acrylate;

methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylol ethane trimethacrylate, trimethylol propane trimethacrylate, 2,2-bis(4-methacryloyloxy polyethoxy phenyl)propane, N,N-dimethylamino methacrylamide, N,N-dimethylaminoethyl methacrylamide, and N,N-dimethylaminopropyl methacrylamide; and derivatives of allyl compounds such as allyl glycidyl ether, diallyl phthalate, and triallyl trimellitate.

Among them, from the viewpoint of ejection stability of the ink composition, water-soluble polymerizable compounds having an ethylenically unsaturated bond are preferable. The term "water-soluble" used herein has the same definition as that previously mentioned in connection with the specific polymerizable compound.

Among the water-soluble polymerizable compounds having an ethylenically unsaturated bond, at least one selected from the group consisting of acrylic acid, methacrylic acid, an ester derivative thereof, an amide derivative thereof, and a salt thereof is preferable, and examples thereof include a monoester of acrylic acid and a monoester of methacrylic acid (hereinafter, also referred to as a "monoacrylate"), an ester of acrylic acid and a polyol compound, and an ester of methacrylic acid and a polyol compound (hereinafter, also referred to as a "polyfunctional acrylate monomer" or a "polyfunctional acrylate oligomer"), acrylamide, methacrylamide, and a derivative thereof.

From the viewpoint of imparting water solubility, the water-soluble polymerizable compound having an ethylenically unsaturated bond used in the present invention preferably has at least one of a poly(ethyleneoxy) chain, a poly(propyleneoxy) chain, an ionic group (for example, a carboxy group, a sulfo group, or the like) or a hydroxyl group.

In a case in which the water-soluble polymerizable compound having an ethylenically unsaturated bond has a poly(ethyleneoxy) chain or a poly(propyleneoxy) chain, the number of ethyleneoxy unit or propyleneoxy unit is preferably in a range of from 1 to 10, and more preferably in a range of from 1 to 5. When the number of unit is 10 or less, hardness of a film after curing, adhesion of a film with respect to a recording medium, or the like, can be improved.

In a case in which the ink composition of the present invention contains the additional polymerizable compound, the content of the additional polymerizable compound is preferably in a range of from 0.1% by mass to 50% by mass in terms of solid matter content, with respect to the total mass of the ink composition. The content is more preferably in a range of from 0.5% by mass to 40% by mass, and even more preferably in a range of from 1.0% by mass to 30% by mass.

Further, the content ratio of the additional polymerizable compound with respect to the specific polymerizable compound is preferably in a range of from 0% by mass to 80% by mass in terms of solid matter content, more preferably in a range of from 0% by mass to 70% by mass, and even more preferably in a range of from 0% by mass to 60% by mass.

(Polymerization Initiator)

The aqueous ink composition of the present invention contains at least one kind of polymerization initiator. As the polymerization initiator, known polymerization initiators may be used without being particularly limited. In the present invention, a photopolymerization initiator is preferably used as the polymerization initiator.

Preferable examples of the photopolymerization initiator which can be used in the present invention include (a) aromatic ketones, (b) acyl phosphine compounds, (c) aromatic onium salt compounds, (d) organic peroxides, (e) thio compounds, (f) hexaaryl biimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

Specific examples of the polymerization initiator include the polymerization initiators described on pages 65 to 148 of "SHIGAISEN KOKA SISUTEMU (Ultraviolet Ray Curing System)" written by Kiyoshi KATO (published by Comprehensive Technology Center, 1989).

As the polymerization initiator in the present invention, either an aqueous dispersion of water-insoluble polymerization initiator or a water-soluble polymerization initiator may be used, but a water-soluble polymerization initiator is preferably used. The term "water-soluble" used for a polymerization initiator means that the polymerization initiator dissolves in distilled water at 25° C. at a proportion of 0.5% by mass or more. The water-soluble polymerization initiator preferably dissolves in distilled water at 25° C. at a proportion of 1% by mass or more, and more preferably dissolves at a proportion of 3% by mass or more.

In the present invention, the polymerization initiator may be used alone or in a combination of two or more kinds.

The content of the polymerization initiator in the ink composition of the invention is preferably in a range of from 0.1% by mass to 30% by mass in terms of solid matter content, with respect to the total mass of the ink composition. The content is more preferably in a range of from 0.5% by mass to 20% by mass, and even more preferably in a range of from 1.0% by mass to 15% by mass.

Further, the content of the polymerization initiator in the ink composition of the invention is preferably in a range of from 0.01 parts by mass to 35 parts by mass with respect to 100 parts by mass of the polymerizable compound, more preferably in a range of from 0.1 parts by mass to 30 parts by mass, and even more preferably in a range of from 0.5 parts by mass to 30 parts by mass. The term "the content of the polymerization initiator" means the total content of the polymerization initiator(s) in the ink composition, and "the content of the polymerizable compound" means the total content of the polymerizable compound(s) (the total content of the specific polymerizable compound and optionally included additional polymerizable compounds) in the ink composition.

(Colorant)

The ink composition in the present invention preferably contains at least one kind of colorant. As the colorant used in the present invention, known dyes, pigments or the like can be used without being restricted. Above all, a colorant being substantially insoluble in water or hardly soluble in water is preferable from the viewpoint of coloring power. Specific examples of such colorants include various kinds of pigments, disperse dyes, oil-soluble dyes, and dyes capable of forming a J-aggregation. Among theses, pigments are more preferable from the viewpoint of light fastness.

The type of the pigment used in the invention is not particularly limited, and a conventionally known organic pigment or inorganic pigment may be used.

Examples of the organic pigment include an azo pigment, a polycyclic pigment, a dye chelate, a nitro pigment, a nitroso pigment, and aniline black. Among them, an azo pigment, a polycyclic pigment, and the like are preferable. Examples of the azo pigment include azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye chelate and an acidic dye chelate.

Examples of the inorganic pigment include titanium oxide, iron oxide, calcium carbonate, barium sulfate, aluminum hydroxide, barium yellow, cadmium red, chrome yellow, and carbon black. Among them, carbon black is particularly preferable. The carbon black may be those produced by a known method, for example, a contact method, a furnace method, a thermal method, or the like.

Specific examples of the pigment which can be used in the invention include the pigments described in paragraphs [0142] to [0145] of JP-A No. 2007-100071, and the like.

Further, in the case of using a dye as the colorant in the invention, a dye held by a water-insoluble carrier can be used. Known dyes can be used without being restricted. For example, the dyes described in JP-A Nos. 2001-115066, 2001-335714 and 2002-249677, and the like, can be preferably used in the present invention. Further, the carrier is not particularly limited as far as it is insoluble in water or hardly soluble in water, and an inorganic material, an organic material, or a complex material thereof may be used. Specifically, the carriers described in JP-A Nos. 2001-181549 and 2007-169418, and the like, can be preferably used in the present invention.

The carrier (colorant) that holds a dye may be used as it is, or may be used in combination with a dispersant, as necessary. As the dispersant, the dispersants described below are suitably used.

The pigment may be used alone or as a combination of two or more kinds selected from the same group as mentioned above, or from different groups as mentioned above.

The content of the colorant (in particular, a pigment) in the aqueous ink composition is preferably from 1% by mass to 25% by mass, and more preferably from 5% by mass to 20% by mass, with respect to the total mass of the ink composition, from the viewpoints of color density, granularity, ink stability, and ejection reliability.

(Dispersant)

In the case in which the colorant is a pigment, the colorant preferably forms colored particles being dispersed in an aqueous solvent via a dispersant. The dispersant may be a polymer dispersant, or may be a surfactant-type dispersant having a low molecular weight. Further, the polymer dispersant may be either a water-soluble polymer dispersant or a water-insoluble polymer dispersant.

In the present invention, a water-insoluble polymer dispersant is preferable from the viewpoints of dispersion stability and ejectability when the ink composition is used in an inkjet system.

—Water-Insoluble Polymer Dispersant—

The water-insoluble polymer dispersant (hereinafter, also referred to as a "dispersant") according to the invention is not particularly limited as far as the dispersant is a water-insoluble polymer capable of dispersing a pigment, and known water-insoluble polymer dispersants may be used. The water-insoluble polymer dispersant may include, for example, both of a hydrophobic unit and a hydrophilic unit.

Examples of a monomer that constitutes the hydrophobic unit include a styrene polymer, alkyl(meth)acrylate, and aromatic group-containing (meth)acrylate.

Further, a monomer that constitutes the hydrophilic constituent unit is not particularly limited as far as the monomer contains a hydrophilic group. Examples of the hydrophilic group include a nonionic group, a carboxyl group, a sulfonic acid group, and a phosphoric acid group. Examples of the nonionic group include a hydroxyl group, an amide group (in which the nitrogen atom is not substituted), a group derived from an alkylene oxide polymer (for example, polyethylene oxide, polypropylene oxide, or the like), and a group derived from sugar alcohol.

From the viewpoint of dispersion stability, the hydrophilic unit in the present invention preferably contains at least a carboxyl group, and an embodiment in which the hydrophilic unit contains both of a nonionic group and a carboxyl group is also preferable.

Specific examples of the water-insoluble polymer dispersant in the invention include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

The term "(meth)acrylic acid" means acrylic acid or methacrylic acid.

From the viewpoint of dispersion stability of the pigment, the water-insoluble polymer dispersant in the present invention is preferably a vinyl polymer containing a carboxyl group, and more preferably a vinyl polymer having at least a unit derived from an aromatic group-containing monomer as the hydrophobic unit, and a unit containing a carboxyl group as the hydrophilic unit.

Further, the weight average molecular weight of the water-insoluble polymer dispersant is preferably from 3,000 to 200,000, more preferably from 5,000 to 100,000, even more preferably from 5,000 to 80,000, and particularly preferably from 10,000 to 60,000, from the viewpoint of dispersion stability of the pigment.

From the viewpoints of dispersibility of the pigment, ink coloring property and dispersion stability, the content of the dispersant in the colored particles in the present invention is preferably from 10% by mass to 100% by mass with respect to the pigment. The content is more preferably from 20% by mass to 70% by mass, and particularly preferably from 30% by mass to 50% by mass.

When the content of the dispersant in the colored particles is within the above range, it is preferable since the pigment is covered with a suitable amount of the dispersant, and colored particles having a small particle diameter and excellent stability over time may be easily obtained.

The colored particles in the present invention may contain a further dispersant, in addition to the water-insoluble polymer dispersant. For example, a known water-soluble low-molecular-weight dispersants, water-soluble polymers, or the like may be used. The content of the dispersant other than the water-insoluble polymer dispersant may be within the range of the content of the dispersant as mentioned above.

It is preferable that the colorant in the present invention includes the pigment and the water-insoluble polymer dispersant, from the viewpoints of dispersion stability and ejectability. It is preferable that at least a part of the surface of the pigment is covered with the water-insoluble polymer dispersant. Such a colorant may be obtained as a colored particle dispersion, which may be prepared, for example, by dispersing a mixture containing a pigment, a dispersant and optionally a solvent (preferably an organic solvent) in a disperser.

The colored particle dispersion can be produced by, for example, adding an aqueous solution containing a basic substance to a mixture containing the pigment, the water-insoluble polymer dispersant, and an organic solvent which dissolves or disperses the dispersant (a mixing and hydration process), and then removing the organic solvent from the mixture (a solvent removal process). In this method, a dispersion of colored particles in which the colorant is finely dispersed, which dispersion exhibits excellent storage stability, can be produced.

It is necessary that the organic solvent can dissolve or disperse the dispersant. In addition to that, the organic solvent preferably has a certain degree of affinity to water. Specifically, an organic solvent having a solubility in water at 20° C. of from 10% by mass to 50% by mass is preferable.

More specifically, the colored particle dispersion can be produced by a production method including the following process (1) and process (2). However, the invention is not limited to these processes.

Process (1): dispersing a mixture containing a pigment, a dispersant, an organic solvent capable of dissolving or dispersing the dispersant, together with a solution containing a basic substance and water as a main component.

Process (2): removing at least a part of the organic solvent from the mixture after the dispersion.

In process (1), first, the above dispersant is dissolved or dispersed in an organic solvent to obtain a mixture (a mixing process). Subsequently, a pigment, a solution containing a basic substance and water as a main component, water, and optionally a surfactant or other additives are added to the mixture, and the mixture is dispersed to obtain an oil-in-water type dispersion.

The basic substance is used to neutralize anionic groups (preferably, carboxyl groups) which may be present in the polymer. The degree of neutralization of the anionic groups is not particularly limited. Typically, the liquid properties of the finally obtained colored particle dispersion is, for example, preferably pH 4.5 to 10. The value of pH may be determined according to the desired degree of neutralization of the polymer.

Preferable examples of the organic solvent include alcohol solvents, ketone solvents, and ether solvents. Specific examples of the alcohol solvents include ethanol, isopropanol, n-butanol, tertiary butanol, isobutanol, and diacetone alcohol. Specific examples of the ketone solvents include acetone, methyl ethyl ketone, diethyl ketone, and methyl isobutyl ketone. Specific examples of the ether solvents include dibutyl ether, tetrahydrofuran, and dioxane. Among these solvents, isopropanol, acetone, and methyl ethyl ketone are preferable, and methyl ethyl ketone is particularly preferable. The organic solvents may be used alone or as a combination of two or more kinds thereof.

In the production of the colored particle dispersion, kneading and dispersion treatment may be carried out while applying strong shear force by using a twin roll, a triple roll, a ball mill, a thoron mill, a Disper, a kneader, a co-kneader, a homogenizer, a blender, a single-screw extruder, a twin-screw extruder, or the like. Details of the kneading and the dispersion are described in, for example, "Paint Flow and Pigment Dispersion" written by T. C. Patton (published by John Wiley and Sons, Inc., 1964) and the like.

Further, as necessary, a colored particle dispersion can be prepared by a fine dispersion treatment using beads which have a particle diameter of from 0.01 mm to 1 mm and are made of glass, zirconia, or the like, with a vertical or horizontal sand grinder, a pin mill, a slit mill, an ultrasonic disperser, or the like.

The method of removing the organic solvent in the method for producing the colored particle dispersion is not particularly limited, and the organic solvent can be removed by a known method such as distillation under reduced pressure.

The colored particles in the colored particle dispersion thus obtained can maintain a favorable state of being dispersed, and the obtained colored particle dispersion exhibits excellent stability over time.

In the present invention, the volume average particle diameter of the colorant (or the colored particles) is preferably from 10 nm to 200 nm, more preferably from 10 nm to 150 nm, and even more preferably from 10 nm to 100 nm. When the volume average particle diameter is 200 nm or less, color reproducibility may become satisfactory, and in the case of an inkjet system, favorable ejection properties may be achieved. When the volume average particle diameter is 10 nm or more, lightfastness may be satisfactory.

There is no particular limitation as to the particle diameter distribution of the colorant (or the colored particles), and the colorant (or the colored particles) may have either a broad particle diameter distribution or a monodispersed particle diameter distribution. It is also possible to use two or more types of colorants each having a monodispersed particle diameter distribution in combination.

The volume average particle diameter and the particle diameter distribution of the colorant (or the colored particles) can be measured by, for example, a light scattering method.

In the present invention, the colorant (or the colored particles) may be used alone, or two or more types thereof may be used in combination.

(Aqueous Medium)

The ink composition of the present invention contains an aqueous medium. The aqueous medium includes at least water, and may further include at least one kind of organic solvent, as necessary.

The water used in the invention is preferably water that does not contain ionic impurities, for example, ion-exchanged water or distilled water. Further, the content ratio of water in the ink composition may be appropriately selected depending on the purpose, but the content ratio of water is typically preferably from 10% by mass to 95% by mass, and more preferably from 30% by mass to 90% by mass.

—Organic Solvent—

It is preferable that the aqueous medium in the present invention contains at least one water-soluble organic solvent. When a water-soluble organic solvent is contained, effects of preventing drying, moistening, or promoting permeation can be obtained. Specifically, for the purpose of preventing drying, a water-soluble organic solvent is suitably used as an anti-drying agent that prevents nozzle clogging caused by an aggregation formed from ink attached to ink ejection ports and dried, and the water-soluble organic solvent preferably has a lower vapor pressure than that of water from the viewpoint of preventing drying or moistening. Further, a water-soluble organic solvent may be used as a permeation promoter that enhances permeability of ink into paper.

Examples of the water-soluble organic solvent include alkanediols (polyhydric alcohols) such as glycerin, 1,2,6-hexanetriol, trimethylolpropane, ethylene glycol, and propylene glycol; sugar alcohols; alkyl alcohols having from 1 to 4 carbon atoms such as ethanol, methanol, butanol, propanol, and isopropanol; and glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether. These water-soluble organic solvents may be used alone or two or more kinds thereof in combination.

For the purpose of preventing drying or moistening, polyhydric alcohols are useful. Examples thereof include glycerin, ethylene glycol, diethylene glycol, triethylene glycol, propylene glycol, dipropylene glycol, tripropylene glycol, 1,3-butanediol, and 2,3-butanediol. These polyhydric alcohols may be used alone or in a combination of two or more kinds For the purpose of promoting permeation, polyol compounds are preferable, and aliphatic diol is suitably used. Examples of the aliphatic diol include 2-ethyl-2-methyl-1,3-propanediol, 3,3-dimethyl-1,2-butanediol, 2,2-diethyl-1,3-propanediol, 2-ethyl-1,3-hexanediol, and 2,2,4-trimethyl-1,3-pentanediol. Among them, 2-ethyl-1,3-hexanediol and 2,2,4-trimethyl-1,3-pentanediol are preferable.

Further, the water-soluble organic solvent in the present invention preferably includes at least one compound represented by the following Structural Formula (1), from the viewpoint of suppressing the occurrence of curling of a recording medium.

Structural Formula (1)

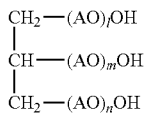

In Structural Formula (1), l, m, and n each independently represent an integer of 1 or more, and l+m+n is 3 to 15. l+m+n is preferably from 3 to 12, and more preferably from 3 to 10. When the value of l+m+n is 3 or more, a favorable effect of suppressing curling may be exhibited, and when the value of l+m+n is 15 or less, favorable ejectability may be obtained. In Structural Formula (1), AO represents at least one of ethyleneoxy (EO) or propyleneoxy (PO). Among them, a propyleneoxy group is preferable. Each of AO in $(AO)_l$, $(AO)_m$ and $(AO)_n$ may be the same or different from each other.

Examples of the compound represented by the above Structural Formula (1) include the compounds shown below. However, the present invention is not limited to these examples. In these exemplary compounds, the description "POP (3) glyceryl ether" means that the compound is glyceryl ether in which three propyleneoxy groups in total are bonded to glycerin, and a similar definition also applies to the other descriptions.

| | | |
|---|---|---|
| $CH_2—(PO)_lOH$ | $1+m+n=3$ | POP (3) glyceryl ether |
| | $1+m+n=4$ | POP (4) glyceryl ether |
| $CH—(PO)_mOH$ | $1+m+n=5$ | POP (5) glyceryl ether |
| | $1+m+n=6$ | POP (6) glyceryl ether |
| $CH_2—(PO)_nOH$ | $1+m+n=7$ | POP (7) glyceryl ether |

Further, the following exemplary water-soluble organic solvents are also preferable as the water-soluble organic solvent in the present invention, from the viewpoint of suppressing the occurrence of curling of a recording medium.

n-$C_4H_9O(AO)_4$—H (AO is EO or PO, and the ratio EO:PO is 1:1)

n-$C_4H_9O(AO)_{10}$—H (AO is EO or PO, and the ratio EO:PO is 1:1)

$HO(AO)_{40}$—H (AO is EO or PO, and the ratio EO:PO is 1:3)

$HO(AO)_{55}$—H (AO is EO or PO, and the ratio EO:PO is 5:6)

$HO(PO)_3$—H $HO(PO)_7$—H 1,2-Hexanediol

The content ratio of the compound represented by Structural Formula (1) and the exemplary compound as shown above with respect to the total water-soluble organic solvent is preferably 3% by mass or more, more preferably 4% by mass or more, and even more preferably 5% by mass or more. When the content is within the above range, curling may be suppressed without causing deterioration in stability or ejectability of ink, which is preferable.

In the present invention, the water-soluble organic solvent may be used alone, or as a combination of two or more kinds thereof.

Further, the content of the water-soluble organic solvent in the ink composition is preferably from 1% by mass to 60% by mass, and more preferably from 5% by mass to 40% by mass.

(Resin Particles)

The ink composition of the present invention preferably contains at least one type of resin particles. When resin particles are included, fixability of the ink composition to a recording medium, and scratch resistance or blocking resistance of an image may be effectively improved.

Further, the resin particles preferably have a function of fixing the ink composition, i.e., an image, by causing thickening of the ink via aggregation or unstabilization of the same upon contact with a treatment liquid described later or a portion of a recording medium onto which the treatment liquid has been applied and dried. Such resin particles are preferably dispersed in at least one of water or an organic solvent.

Examples of the resin particles, which may be used in the invention, include particles of an acrylic resin, a vinyl acetate resin, a styrene-butadiene resin, a vinyl chloride resin, an acrylic-styrene resin, a butadiene resin, a styrene resin, a crosslinked acrylic resin, a crosslinked styrene resin, a benzoguanamine resin, a phenol resin, a silicone resin, an epoxy resin, a urethane resin, a paraffin resin, a fluororesin, or the like, and a latex of such resins. Preferable examples of the resin particles include particles of an acrylic resin, an acrylic-styrene resin, a styrene resin, a crosslinked acrylic resin, or a crosslinked styrene resin.

Further, the resin particles may be used in the form of a latex.

The weight average molecular weight of the resin particles is preferably from 10,000 to 200,000, and more preferably from 100,000 to 200,000.

The volume average particle diameter of the resin particles is preferably in a range of from 10 nm to 1 μm, more preferably in a range of from 10 nm to 200 nm, even more preferably in a range of from 20 nm to 100 nm, and particularly preferably in a range of from 20 nm to 50 nm.

The glass transition temperature Tg of the resin particles is preferably 30° C. or higher, more preferably 40° C. or higher, and even more preferably 50° C. or higher.

The addition amount of the resin particles with respect to the ink is preferably from 0.1% by mass to 20% by mass, more preferably from 0.1% by mass to 15% by mass.

The particle diameter distribution of the resin particles is not particularly limited, and the resin particles may have either a broad particle diameter distribution or a monodispersed particle diameter distribution. It is also possible to use a mixture of two or more types of resin particles each having a monodispersed particle diameter distribution.

(Surfactant)

The ink composition in the present invention may include, as necessary, at least one kind of surfactant. The surfactant may be used as a surface tension adjusting agent.

As the surface tension adjusting agent, a compound having a structure including both a hydrophilic moiety and a hydrophobic moiety in the molecule, or the like, can be effectively used, and any of an anionic surfactant, a cationic surfactant, an amphoteric surfactant, a nonionic surfactant, or a betaine surfactant can be used. Further, the above-described dispersant (a polymer dispersant) may also be used as a surfactant.

In the present invention, a nonionic surfactant is preferable from the viewpoint of suppressing the interference between the spotted ink droplets, and among them, acetylene glycol derivatives are more preferable.

In a case in which the ink composition contains a surfactant (a surface tension adjusting agent), the surfactant is preferably added in an amount that can adjust the surface tension of the ink composition to be from 20 mN/m to 60 mN/m from the viewpoint of favorably ejecting the ink composition by an inkjet system, and from the viewpoint of the surface tension, the amount is more preferably from 20 mN/m to 45 mN/m, even more preferably 25 mN/m to 40 mN/m.

The specific amount of the surfactant in the ink composition is not particularly limited, except that it is preferred to satisfy the surface tension to be within the above range, but is preferably 1% by mass or higher, more preferably from 1% by mass to 10% by mass, and even more preferably from 1% by mass to 3% by mass.

(Other Components)

In addition to the above components, the ink composition may further contain various additives as other components, as necessary.

Examples of the additives include known additives such as an ultraviolet absorbent, a color fading inhibitor, a mildew proofing agent, a pH adjusting agent, an anti-rust agent, an antioxidant, an emulsification stabilizer, an antiseptic, an antifoaming agent, a viscosity adjusting agent, a dispersion stabilizer, a chelating agent, and a solid wetting agent.

Examples of the ultraviolet absorbent include a benzophenone ultraviolet absorbent, a benzotriazole ultraviolet absorbent, a salicylate ultraviolet absorbent, a cyanoacrylate ultraviolet absorbent, and a nickel complex salt ultraviolet absorbent.

As the color fading inhibitor, various organic color fading inhibitors and metal complex color fading inhibitors can be used. Examples of the organic color fading inhibitors include hydroquinones, alkoxyphenols, dialkoxyphenols, phenols, anilines, amines, indanes, chromanes, alkoxyanilines, and heterocycles. Examples of the metal complex color fading inhibitors include nickel complexes and zinc complexes.

Examples of the mildew proofing agent include sodium dehydroacetate, sodium benzoate, sodium pyridinethiol-1-oxide, ethyl p-hydroxybenzoate, 1,2-benzisothiazolin-3-one, sodium sorbate, and sodium pentachlorophenol.

The content of the mildew proofing agent in the ink composition is preferably from 0.02% by mass to 1.00% by mass.

The pH adjusting agent is not particularly limited as far as it can adjust the pH of the ink composition to a desired value without adversely affecting the ink composition to be prepared, and the pH adjusting agent may be appropriately selected depending on the purpose. Examples of the pH adjusting agent include alcohol amines (for example, diethanol amine, triethanol amine, 2-amino-2-ethyl-1,3-propanediol, and the like), alkali metal hydroxides (for example, lithium hydroxide, sodium hydroxide, potassium hydroxide, and the like), ammonium hydroxides (for example, ammonium hydroxide, quaternary ammonium hydroxide, and the like), phosphonium hydroxides, and alkali metal carbonates.

Examples of the anti-rust agent include acid sulfite, sodium thiosulfate, ammonium thiodiglycolate, diisopropyl ammonium nitrite, pentaerythritol tetranitrate, and dicyclohexyl ammonium nitrite.

Examples of the antioxidant include a phenol antioxidant (including a hindered phenol antioxidant), an amine antioxidant, a sulfur antioxidant, and a phosphorus antioxidant.

Examples of the chelating agent include sodium ethylenediamine tetraacetate, sodium nitrilotriacetate, sodium hydroxyethylethylenediamine triacetate, sodium diethylenetriamine pentaacetate, and sodium uramildiacetate.

—Physical Properties of Ink Composition—

The surface tension (at 25° C.) of the ink composition in the present invention is preferably from 20 mN/m to 60 mN/m, more preferably from 20 mN/m to 45 mN/m, and even more preferably from 25 mN/m to 40 mN/m.

The surface tension of the ink composition is measured using an automatic surface tensiometer (CBV P-Z, trade name, manufactured by Kyowa Interface Science Co., Ltd.) under the condition of 25° C.

The viscosity of the ink composition in the present invention at 25° C. is preferably from 1.2 mPa·s to 15.0 mPa·s, more preferably from 2 mPa·s but less than 13 mPa·s, and even more preferably from 2.5 mPa·s but less than 10 mPa·s.

The viscosity of the ink composition can be measured using a viscometer (TV-22, trade name, manufactured by TOKI SANGYO CO., LTD.) under the condition of 25° C.

<Ink Set>

The ink set of the present invention includes at least one kind of aqueous ink composition described above and at least one kind of treatment liquid, the at least one kind of treatment liquid including an aggregating agent that can form an aggregate by contacting the aqueous ink composition.

By forming an image using an ink composition containing a specific polymerizable compound and a polymerization initiator, and a treatment liquid containing an aggregating agent, an image with favorable image quality, high curing sensitivity and excellent blocking resistance can be formed.

[Treatment Liquid]

The treatment liquid of the present invention includes at least one kind of aggregating agent that can form an aggregate by contacting the ink composition, and may further include other components, if necessary.

When the treatment liquid includes an aggregating agent, an image with favorable image quality and excellent blocking resistance can be formed.

(Aggregating Agent)

The treatment liquid in the present invention contains an aggregating agent that aggregates the components included in the ink composition. The aggregating agent in the present invention can aggregate (fix) the ink composition when it is brought into contact with the ink composition on a recording medium, and functions as a fixing agent. For example, by applying the treatment liquid onto a recording medium (preferably, coated paper) and then applying the ink composition onto the recording medium on which the aggregating agent is present, the component in the ink composition is allowed to aggregate and, as a result, is fixed on the recording medium.

Examples of the component that fixes the component in the ink composition include acidic compounds, polyvalent metal salts, and cationic polymers. These components for may be used alone, or in a combination of two or more kinds thereof.

—Acidic Compound—

Preferable examples of the acidic compounds include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, derivatives of these compounds, and salts of these compounds.

Above all, an acidic compound having high water solubility is preferable. Further, from the viewpoint of fixing the entirety of the ink by reaction with the ink composition, an acidic compound having a valency of 3 or less is preferable, and an acidic compound having a valency of 2 to 3 is particularly preferable.

The acidic compound may be used alone, or two or more kinds in combination.

In the case in which the treatment liquid contains the acidic compound, the pH (at 25° C.) of the treatment liquid is preferably from 0.1 to 6.8, more preferably from 0.5 to 6.0, and even more preferably from 0.8 to 5.0.

The content of the acidic compound is preferably 40% by mass or less, and more preferably from 15% by mass to 40% by mass, with respect to the total mass of the treatment liquid. When the content of the acidic compound is from 15% by mass to 40% by mass, the component in the ink composition may be more efficiently fixed.

Further, the content of the acidic compound is preferably from 15% by mass to 35% by mass, and more preferably from 20% by mass to 30% by mass, with respect to the total mass of the treatment liquid.

The amount of the acidic compound to be supplied onto the recording medium is not particularly limited as far as the amount is large enough to aggregate the ink composition, but from the viewpoint of ease of fixation of the ink composition, the application amount of the acidic compound is preferably from 0.5 g/m$^2$ to 4.0 g/m$^2$, and more preferably from 0.9 g/m$^2$ to 3.75 g/m$^2$.

—Polyvalent Metal Salt—

The polyvalent metal salt in the invention is a compound containing a metal having a valency of two or more, such as an alkaline earth metal or a metal belonging to the zinc group. Examples of such polyvalent metal salts include acetic acid salts and oxides of a metal ion such as $Ca^{2+}$, $Cu^{2+}$ and $Al^{3+}$.

In the present invention, when the ink composition is ejected onto a recording medium (preferably, coated paper) to which a treatment liquid containing a polyvalent metal salt has been supplied, the aggregation reaction of the ink composition may be caused by decreasing the dispersion stability of the particles dispersed in the ink composition, for example, particles of a colorant represented by a pigment, resin particles, or the like, and by increasing the viscosity of the entire ink composition. For example, in the case in which the particles such as particles of a pigment or resin particles included in the ink composition have a weakly acidic functional group such as a carboxyl group, the particles are stably dispersed by the action of the weakly acidic functional group. However, the dispersion stability of the particles can be lowered by decreasing the surface charges of the particles by allowing the particles to interact with the polyvalent metal salt. Therefore, from the viewpoint of aggregation reaction, the polyvalent metal salt included in the treatment liquid as a fixing agent needs to be a salt of a metal ion having a valency of two or more, i.e., a salt of a polyvalent metal ion, and from the viewpoint of the aggregation reactivity, the polyvalent metal salt is preferably a polyvalent metal salt of a polyvalent metal ion having a valency of 3 or more.

From the viewpoints described above, the polyvalent metal ion that can be used in the treatment liquid in the invention is preferably at least one selected from the group consisting of the salts of the following polyvalent metal ions with an anion, polyaluminum hydroxide, and polyaluminum chloride.

Examples of the polyvalent metal ion include $Ca^{2+}$, $Cu^{2+}$, $Ni^{2+}$, $Mg^{2+}$, $Sr^{2+}$, $Zn^{2+}$, $Ba^{2+}$, $Al^{3+}$, $Fe^{3+}$, $Cr^{3+}$, $Co^{3+}$, $Fe^{2+}$, $La^{3+}$, $Nd^{3+}$, $Y^{3+}$ and $Zr^{4+}$. In order to include the polyvalent metal ion in the treatment liquid, a salt of the above polyvalent metal ions can be used.

In the present specification, the term "salt" means a metal salt formed by a polyvalent metal ion such as that described above and an anion capable of being bonded to the ion. It is preferable that the salt is soluble in a solvent. The term "solvent" means a medium that forms a treatment liquid together with the polyvalent metal salt, and examples thereof include water and an organic solvent to be described later.

Preferable examples of the anion for forming a salt with a polyvalent metal ion include $Cl^-$, $NO_3^-$, $I^-$, $Br^-$, $ClO_3^-$, $CH_3COO^-$, and $SO_4^{2-}$.

The salt of a polyvalent metal ion and an anion may be formed from one or more types of polyvalent metal ions and one or more types of anions, respectively.

Examples of the polyvalent metal salts other than those described above include polyaluminum hydroxides and polyaluminum chlorides.

In the present invention, from the viewpoints of reactivity, coloring property, ease of handling, and the like, it is preferable to use a salt of a polyvalent metal ion and an anion, and as the polyvalent metal ion, at least one selected from the group consisting of $Ca^{2+}$, $Mg^{2+}$, $Sr^{2+}$, $Al^{3+}$ and $Y^{3+}$ is preferable, and $Ca^{2+}$ is more preferable.

Further, as the anion, $NO_3^-$ is particularly preferable from the viewpoint of solubility or the like.

One of the polyvalent metal salts may be used alone, or two or more kinds thereof may be used in combination.

The content of the polyvalent metal salt is 15% by mass or more with respect to the total mass of the treatment liquid.

When the content of the polyvalent metal salt is 15% by mass or more, the component in the ink composition can be more effectively fixed.

The content of the polyvalent metal salt is preferably from 15% by mass to 35% by mass, and more preferably from 20% by mass to 30% by mass, with respect to the total mass of the treatment liquid.

The amount of the polyvalent metal salt to be supplied onto a recording medium is not particularly limited as far as the amount is large enough to aggregate the ink composition, but from the viewpoint of ease of fixation of the ink composition, the application amount of the polyvalent metal salt is preferably from 0.5 $g/m^2$ to 4.0 $g/m^2$, and more preferably from 0.9 $g/m^2$ to 3.75 $g/m^2$.

—Cationic Polymer—

The cationic polymer is at least one cationic polymer selected from the group consisting of poly(vinylpyridine) salts, polyalkylamino ethyl acrylates, polyalkylamino ethyl methacrylates, poly(vinyl imidazole), polyethylene imine, polybiguanides and polyguanides.

The cationic polymers may be used alone, or may be used in a combination of two or more kinds thereof.

Among these cationic polymers, polyguanides (preferably, poly(hexamethylene guanidine)acetate, polymonoguanide, and polymeric biguanide), polyethylene imine, and poly(vinyl pyridine) salts are preferable since these compounds are advantageous in view of aggregation speed.

The weight average molecular weight of the cationic polymer is preferably smaller from the viewpoint of the viscosity of the treatment liquid. In the case of applying the treatment liquid onto a recording medium by an inkjet system, the weight average molecular weight of the cationic polymer is preferably in a range of from 500 to 500,000, more preferably in a range of from 700 to 200,000, and even more preferably in a range of from 1,000 to 100,000. When the weight average molecular weight is 500 or more, it is advantageous in terms of aggregation speed, and when the weight average molecular weight is 500,000 or less, it is advantageous in terms of ejection reliability. However, the above preferable ranges do not necessarily apply to the case in which the treatment liquid is supplied onto the recording medium by a method other than inkjetting.

In the case in which the treatment liquid contains a cationic polymer, the pH (at 25° C.) of the treatment liquid is preferably from 1.0 to 10.0, more preferably from 2.0 to 9.0, and even more preferably from 3.0 to 7.0.

The content of the cationic polymer is preferably from 1% by mass to 35% by mass, and more preferably from 5% by mass to 25% by mass, with respect to the total mass of the treatment liquid.

The amount of the cationic polymer to be supplied onto coated paper is not particularly limited as far as the amount is large enough to stabilize the ink composition, but from the viewpoint of ease of fixation of the ink composition, the application amount of the cationic polymer is preferably from 0.5 $g/m^2$ to 4.0 $g/m^2$, and more preferably from 0.9 $g/m^2$ to 3.75 $g/m^2$.

<Image Forming Method>

The image forming method of the present invention includes at least a treatment liquid applying process, in which the treatment liquid included in the ink set is applied onto a recording medium, and an ink applying process, in which an image is formed by applying the ink composition included in the ink set onto the recording medium. The method may include other processes, as necessary.

[Recording Medium]

The recording medium used in the image forming method of the present invention is not particularly limited, and common printing paper including cellulose as a main component, such as so-called wood free paper, coated paper, and art paper, which are used in general offset printing or the like, may be used. When an image is recorded on common printing paper containing cellulose as a main component using an aqueous ink by an ordinary inkjet method, absorption or drying of ink is relatively slow and migration of a colorant tends to occur after the ejection of ink. As a result, the image quality tends to deteriorate. However, according to the inkjet recording method of the present invention, migration of the colorant is suppressed and a high grade image with excellent color density and excellent hue can be recorded.

In the image forming method of the invention, any recording medium generally commercially available may be used and examples thereof include wood free paper (A) such as "OK PRINCE WOOD FREE PAPER" (trade name, manufactured by Oji Paper Co., Ltd.), "SHIORAI" (trade name, manufactured by Nippon Paper Industries Co., Ltd.), and "NEW NPI WOOD FREE PAPER" (trade name, manufactured by Nippon Paper Industries Co., Ltd.); wood free coated paper such as "SILVER DAIYA" (trade name, manufactured by Nippon Paper Industries Co., Ltd.); very light-weight coated paper such as "OK EVER LITE COAT" (trade name, manufactured by Oji Paper Co., Ltd.) and "AURORA S" (trade name, manufactured by Nippon Paper Industries Co., Ltd.); light weight coated paper (A3) such as "OK COAT L" (trade name, manufactured by Oji Paper Co., Ltd.) and "AURORA L" (trade name, manufactured by Nippon Paper Industries Co., Ltd.); coated paper (A2, B2) such as "OK TOPCOAT+" (trade name, manufactured by Oji Paper Co., Ltd.) and "AURORA COAT" (trade name, manufactured by Nippon Paper Industries Co., Ltd.); and art paper (A1) such as "OK KINFUJI+" (trade name, manufactured by Oji Paper Co., Ltd.) and "TOKUBISHI ART" (trade name, manufactured by Mitsubishi Paper Mills, Ltd.). It is also possible to use various photographic papers for inkjet recording.

Among these recording media, a recording medium having a water absorption coefficient Ka of from 0.05 $mL/m^2 \cdot ms^{1/2}$ to 0.5 $mL/m^2 \cdot ms^{1/2}$ is preferable, a recording medium having a water absorption coefficient Ka of from 0.1 $mL/m^2 \cdot ms^{1/2}$ to 0.4 $mL/m^2 \cdot ms^{1/2}$ is more preferable, and a recording medium having a water absorption coefficient Ka of from 0.2 $mL/m^2 \cdot ms^{1/2}$ to 0.3 $mL/m^2 \cdot ms^{1/2}$ is even more preferable, from the viewpoint of achieving a significant effect of suppressing the migration of colorant, and obtaining a high grade image with color density and hue that are improved more than ever.

The water absorption coefficient Ka has the same definitions as that described in JAPAN TAPPI PAPER PULP TEST METHOD No. 51: 2000 (published by Japan Technical Association Paper and Paper Industry), the disclosure of which is incorporated by reference herein. Specifically, the water absorption coefficient Ka is calculated from the difference between the water transfer amount at a contact time of 100 ms and the water transfer amount at a contact time of 900 ms, which are measured with an automatic scanning liquid absorptometer (KM500WIN, trade name, manufactured by Kumagai Riki Kogyo Co., Ltd.)

Among the recording media, a so-called coated paper which is used in general offset printing and the like is preferable. Coated paper is prepared by applying a coating material onto paper having a surface that is typically not treated and including cellulose as a main component, such as wood free paper, acid free paper, or the like. The coated paper is likely to cause problems in quality, such as glossiness or scratch resistance of images, when image formation is performed by an ordinary aqueous inkjet recording method. However, according to the inkjet recording method of the present invention, an image that exhibits suppressed gloss unevenness and exhibits favorable glossiness and scratch resistance can be obtained. It is preferable to use a coated paper including a base paper and a coat layer, the coat layer containing kaolin and/or calcium bicarbonate. More specifically, an art paper, a coated paper, a light-weight coated paper, or a finely coated paper is more preferable.

[Treatment Liquid Applying Process]

In the treatment liquid applying process, the treatment liquid, which is included in the above ink set and contains an aggregating agent and an acid generating agent, is applied onto the recording medium. As to the method for applying the treatment liquid onto the recording medium, a known method for applying a liquid may be used without any particular limitation. The method can be selected from various methods including spray coating, roller coating, inkjet coating, dipping and the like.

Specific examples of the method for applying the treatment liquid include size press methods represented by a horizontal size press method, a roll coater method, a calender size press method, and the like; knife coater methods represented by an air knife coater method and the like; roll coater methods represented by a transfer roll coater method such as a gate roll coater method or the like, a direct roll coater method, a reverse roll coater method, a squeeze roll coater method, and the like; blade coater methods represented by a bill blade coater method, a short dwell coater method, a two-stream coater method, and the like; bar coater methods represented by a rod bar coater method and the like; cast coater methods; gravure coater methods; curtain coater methods; die coater methods; brush coater methods; and transfer methods.

The coating may be performed by a method in which the coating amount is controlled while coating by using a coating apparatus equipped with a liquid amount controller, such as a coating apparatus described in JP-A No. 10-230201.

The treatment liquid may be applied onto the entire surface of a recording medium, or may be applied onto a portion of a region in which inkjet recording is performed in the ink applying process. In the present invention, from the viewpoints of uniformly controlling the application amount of the treatment liquid, uniformly recording fine lines, fine images or the like, and suppressing density unevenness such as image unevenness, the treatment liquid is preferably applied onto the entire surface of the coated paper by a method in which a roller or the like is used for application A method using an anilox roller is an exemplary method of performing coating while controlling the application amount of the treatment liquid to be within the above-described range The anilox roller is a roller having a surface to which a pyramid pattern, a shaded pattern, a hexagonal pattern or the like is formed by subjecting the surface of the roller to which ceramic is melt-sprayed to laser processing. When a treatment liquid is applied onto the surface of the roller, the treatment liquid enters in depressed portions formed on the roller surface, and the treatment liquid is transferred to paper surface upon contact with an application amount being controlled by the depressed portions on the surface of the anilox roller.

[Ink Applying Process]

In the ink applying process in the present invention, the ink composition, which is included in the above-described ink set and contains a colorant, a polymerizable compound, a polymerization initiator and an aqueous medium, is applied onto a recording medium. There is no particular limitation concerning the method for applying the ink composition, and any known method is applicable as far as an ink composition can be applied in the form of a desired image by the method. For example, the ink composition can be applied onto a recording medium by means of an inkjet system, a stencil duplication system, a transfer imprinting system, or the like. Among them, from the viewpoints of reducing the size of the recording apparatus and increasing the recording speed, applying an ink composition by means of an inkjet system is preferable.

(Inkjet System)

Image formation using an inkjet system can be performed by applying energy, thereby ejecting an ink composition onto a recording medium, to form a colored image. In the invention, an inkjet recording method described in paragraphs [0093] to [0105] of JP-A No. 2003-306623 can be suitably applied.

The inkjet system is not particularly limited, and may be selected from known systems such as a charge control system in which an ink is ejected by utilizing an electrostatic attraction force; a drop-on-demand system (pressure pulse system) in which a vibration pressure of a piezo element is utilized; an acoustic inkjet system in which an electric signal is converted to an acoustic beam and an ink is irradiated with the acoustic beam so as to be ejected by utilizing the radiation pressure; or the like.

Further, the inkjet head used in the inkjet system may be either an on-demand system or a continuous system. Ink nozzles and the like, which are used when recording is performed by an inkjet system, are not particularly limited and may be appropriately selected depending on the purpose.

It should be noted that the inkjet system includes a system of discharging a number of small droplets of ink having a low color density, which is referred to as photo ink; a system of improving the image quality by using plural kinds of inks having substantially the same color and different color densities; and a system of using a colorless and transparent ink.

Examples of the inkjet system include a shuttle system in which a short serial head is used and recording is performed by the serial head scanning in a width direction of a recording medium; and a line system using a line head having recording elements being arranged so as to cover the whole length of a side of a recording medium. In the line system, an image can be recorded on the whole surface of a recording medium by allowing the recording medium to move in a direction being at right angles to a direction in which the recording elements are arranged, whereby a delivery system such as a carriage, by which the short head scan, can be omitted. Further, in the line system, since a complicated scanning control for the movement of a carriage and a recording medium is not necessary and only the recording medium moves, a higher recording speed compared with a shuttle system can be realized.

In the present invention, the order of operations for the treatment liquid applying process and the ink applying process is not particularly limited. However, from the viewpoint of image quality, an embodiment in which the ink applying process is carried out after the treatment liquid applying process is preferable. In other words, the ink applying process is preferably a process of applying an ink composition onto a recording medium to which a treatment liquid has been applied.

[Actinic Energy Ray Irradiating Process]

The image forming method of the present invention preferably includes a process of irradiating the ink composition applied onto a recording medium with actinic energy ray. When the ink composition is irradiated with actinic energy ray, the polymerizable compound included in the ink composition polymerizes to form a cured film including a colorant. As a result, scratch resistance and blocking resistance of the image are more effectively improved.

The ink composition applied onto the recording medium cures when exposed to actinic energy ray. Specifically, the polymerization initiator included in the ink composition of the invention decomposes upon exposure to actinic energy ray to generate an initiation species such as radicals, acid or base, and the initiation species initiates and promotes the polymerization reaction of the polymerizable compound, thereby curing the ink composition.

Further, in the process of actinic energy ray irradiation, the acid supplied from the acid generating agent included in the treatment liquid allows further aggregation (fixation) of the ink composition, thereby improving the qualities of imaged areas (such as scratch resistance and blocking resistance).

The actinic energy ray used in the invention may be a ray, γ ray, electron beam, X ray, ultraviolet ray, visible ray, infrared ray, or the like. The wavelength of the actinic energy ray is, for example, preferably from 200 nm to 600 nm, more preferably from 300 nm to 450 nm, and even more preferably from 350 nm to 420 nm.

The output of the actinic energy ray is preferably 5,000 $mJ/cm^2$ or less, more preferably from 10 $mJ/cm^2$ to 4,000 $mJ/cm^2$, and even more preferably from 20 $mJ/cm^2$ to 3,000 $mJ/cm^2$.

As the actinic energy ray source, mercury lamps, gas/solid lasers, and the like are mainly utilized. As the light source used for curing ultraviolet-curable inkjet recording inks, mercury lamps and metal halide lamps are widely known. However, in recent years, a shift to mercury-free lamps has been strongly desired from the viewpoint of environmental protection, and the use of GaN-based semiconductor ultraviolet ray emitting devices is very effective from both industrial and environmental viewpoints. Moreover, LEDs (UV-LEDs) and LDs (UV-LDs) are considered to be promising light sources for photo-curing type inkjet system for their small size, long life, high efficiency and low costs.

It is also possible to use a light-emitting diode (LED) or a laser diode (LD) as the actinic energy ray source. In particular, in the case in which an ultraviolet ray source needs to be used, an ultraviolet LED or an ultraviolet LD can be used. For example, Nichia Corporation markets an ultraviolet LED that mainly emits a spectrum having a wavelength within a range of from 365 nm to 420 nm.

In the present invention, UV-LEDs are particularly preferred actinic energy ray sources, and UV-LEDs having a peak wavelength of from 350 nm to 420 nm are even more preferred.

[Ink Drying Process]

The image forming method of the present invention may include, as needs arise, an ink drying process of drying and removing the solvent (for example, water, a water-soluble organic solvent, or the like) in the ink composition applied onto the recording medium. The ink drying process is not particularly limited as far as at least part of the solvent is removed in the process, and a method commonly used for this purpose is applicable.

For example, drying of the ink may be carried out by a known means for heating such as a heater, a means for air blowing such as a dryer, or a combination of such means. Examples of the heating method include a method of applying heat to a surface of the recording medium opposite to a surface to which the treatment liquid has been applied by using a heater or the like, a method of blowing a warm air or a hot air to a surface of the recording medium to which the treatment liquid has been applied, and a method of heating the recording medium using an infrared heater. The heating may be carried out by using two or more of these methods in combination.

The ink drying process may be carried out either before or after the actinic energy ray irradiation, as long as it is carried out after the ink applying process. In the present invention, it is preferable to carry out the ink drying process before the actinic energy ray irradiation, from the viewpoints of curing sensitivity and blocking resistance.

EXAMPLES

Hereinafter, the present invention is specifically explained with reference to the Examples, but the scope of the present invention is not limited to these Examples. Unless stated otherwise, the "parts" and "%" are based on mass.

(Synthesis of Polymer Dispersant P-1)

88 g of methyl ethyl ketone were placed in a 1000 mL three-necked flask equipped with a stirrer and a cooling tube, and heated to 72° C. under a nitrogen atmosphere. Then, a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added thereto dropwise over 3 hours. After the addition was completed, the mixture was further allowed to react for one hour, and then a solution obtained by dissolving 0.42 g of dimethyl 2,2'-azobisisobutyrate in 2 g of methyl ethyl ketone was added. The temperature of the resulting mixture was elevated to 78° C., and the mixture was heated for 4 hours. The obtained reaction liquid was subjected to reprecipitation twice with an excess of hexane. The resin obtained by the reprecipitation was dried to give 96 g of a polymer dispersant P-1.

The composition of the obtained resin was confirmed by $^1$H-NMR, and the weight average molecular weight (Mw) determined by GPC was 44,600. Further, the acid value of the resin was determined by a method described in JIS Standards (JIS K0070: 1992). The acid value was 65.2 mgKOH/g.

(Preparation of Resin-Coated Pigment Dispersion)

—Resin-Coated Cyan Pigment Dispersion—

10 parts of Pigment Blue 15:3 (trade name: PHTHALOCYANINE BLUE A220, manufactured by Dainichiseika Color & Chemicals Mfg. Co., Ltd.), 5 parts of the polymer dispersant P-1 described above, 42 parts of methyl ethyl ketone, 5.5 parts of 1 mol/L aqueous solution of sodium hydroxide, and 87.2 parts of ion exchanged water were mixed, and dispersed for from 2 hours to 6 hours using a bead mill with zirconia beads having a diameter of 0.1 mm.

From the resulting dispersion, methyl ethyl ketone was removed under a reduced pressure at 55° C., and further a part of water was removed, thereby obtaining a resin-coated cyan pigment dispersion (colored particles) having a pigment concentration of 10.2% by mass.

—Resin-Coated Magenta Pigment Dispersion—

A resin-coated magenta pigment dispersion (colored particles) was prepared in a manner substantially similar to the preparation of the resin-coated cyan pigment dispersion described above, except that CHROMOPHTHAL JET MAGENTA DMQ (trade name, manufactured by BASF Japan; C.I. Pigment Red 122) was used instead of PHTHALOCYANINE BLUE A220 (trade name) that was used as a pigment in the preparation of the resin-coated cyan pigment dispersion.

—Resin-Coated Yellow Pigment Dispersion—

A resin-coated yellow pigment dispersion (colored particles) was prepared in a manner substantially similar to the preparation of the resin-coated cyan pigment dispersion described above, except that IRGALITE YELLOW GS (trade name, manufactured by BASF Japan; C.I. Pigment Yellow 74) was used instead of PHTHALOCYANINE BLUE A220 (trade name) that was used as a pigment in the preparation of the resin-coated cyan pigment dispersion.

—Resin-Coated Black Pigment Dispersion—

A resin-coated black pigment dispersion (colored particles) was prepared in a manner substantially similar to the preparation of the resin-coated cyan pigment dispersion described above, except that pigment dispersion CAB-O-JET 200 (trade name, manufactured by CABOT Corporation; carbon black) was used instead of PHTHALOCYANINE BLUE A220 (trade name) that was used as a pigment in the preparation of the resin-coated cyan pigment dispersion.

(Synthesis of Specific Polymerizable Compound)

—Synthesis of Specific Polymerizable Compound 3—

To a one-liter three-necked flask equipped with a stirrer, 50.0 g (344 mmol) of N,N-bis(3-aminopropyl)methylamine, 55.0 g (1.4 mol) of sodium hydroxide, 300 mL of water, and 450 mL of acetonitrile were added. Then, while cooling in an ice bath, 65.6 g (725 mmol) of acrylic acid chloride was added thereto dropwise. After the addition was completed, the temperature of the mixture was elevated to room temperature, and the mixture was further stirred for 6 hours. Then, from the resulting reaction liquid, acetonitrile was distilled off under reduced pressure. Thereafter, the aqueous layer was extracted 3 times with ethyl acetate. The obtained organic layer was dried with magnesium sulfate, and then filtered. Thereafter, ethyl acetate was distilled off under reduced pressure, thereby obtaining 25.4 g (100 mmol, yield: 29%) of specific polymerizable compound 3.

—Synthesis of Specific Polymerizable Compound 4—

To a one-liter three-necked flask equipped with a stirrer, 50.0 g (342 mmol) of tris(2-aminoethyl)amine, 68.0 g (1.7 mol) of sodium hydroxide, 300 mL of water, and 450 mL of acetonitrile were added. Then, while cooling in an ice bath, 95.9 g (1.1 mol) of acrylic acid chloride was added thereto dropwise. After the addition was completed, the temperature of the mixture was elevated to room temperature, and the mixture was further stirred for 6 hours. Then, from the resulting reaction liquid, acetonitrile was distilled off under reduced pressure. Thereafter, the aqueous layer was extracted 3 times with isobutyl alcohol. The obtained organic layer was dried with magnesium sulfate, and then filtered. Thereafter, isobutyl alcohol was distilled off under reduced pressure, thereby obtaining 42.2 g (137 mmol, yield: 40%) of specific polymerizable compound 4.

—Synthesis of Specific Polymerizable Compound 5—

To a one-liter three-necked flask equipped with a stirrer, 50.0 g (250 mmol) of 1,4-bis(3-aminopropyl)piperazine, 40.0 g (1.0 mol) of sodium hydroxide, 300 mL of water, and 450 mL of acetonitrile were added. Then, while cooling in an ice bath, 47.5 g (525 mmol) of acrylic acid chloride was added thereto dropwise. After the addition was completed, the temperature of the mixture was elevated to room temperature, and the mixture was further stirred for 6 hours. Then, from the resulting reaction liquid, acetonitrile was distilled off under reduced pressure. Thereafter, the aqueous layer was extracted 3 times with isobutyl alcohol. The obtained organic layer was dried over magnesium sulfate and then filtered. Thereafter, isobutyl alcohol was distilled off under reduced pressure, thereby obtaining 47.8 g (155 mmol, yield: 62%) of specific polymerizable compound 5.

—Synthesis of Specific Polymerizable Compound 6—

To a one-liter three-necked flask equipped with a stirrer, 32.6 g (200 mmol) of 2-chloroethanesulfonyl chloride and 200 mL of methylene chloride were added. 20.2 g (200 mmol) of triethylamine was added thereto at −78° C. and stirred for one hour. Thereafter, the mixture was further stirred for two hours at 0° C. To the reaction mixture, 11.7 g (100 mmol) of N,N-bis(2-aminoethyl)methylamine and 20.2 g (200 mmol) of triethylamine were slowly added dropwise. The resulting mixture was stirred for 3 hours at room temperature. Then, from the resulting reaction mixture, methylene chloride was distilled off under reduced pressure. Subsequently, 200 mL of a 0.01 M aqueous solution of hydrochloric acid was added and common salt was further added thereto, and then the resulting liquid was extracted 4 times with 400 mL of ethyl acetate. The obtained organic layer was washed with sodium bicarbonate, dried with magnesium sulfate, and then filtered. Thereafter, the solvent was distilled off under reduced pressure, thereby obtaining 19.3 g (65 mmol, yield: 65%) of specific polymerizable compound 6.

—Synthesis of Specific Polymerizable Compound 11—

To a one-liter three-necked flask equipped with a stirrer, 54.1 g (270 mmol) of 1,4-bis(3-aminopropyl)piperazine, 53.0 g (540 mmol) of maleic anhydride, and 200 mL of acetic acid were added, and the mixture was heated and stirred at 130° C. for 5 hours. Thereafter, the resulting reaction mixture was slowly poured into 500 mL of a 6 N aqueous solution of potassium carbonate. Then, common salt was added thereto, and then the resulting liquid was extracted 3 times with 600 mL of butanol. The obtained organic layer was dried with magnesium sulfate, and then filtered. Thereafter, the solvent was distilled off under reduced pressure, thereby obtaining 51.5 g (143 mmol, yield: 53%) of specific polymerizable compound 11.

—Synthesis of Specific Polymerizable Compound 14—

To a one-liter three-necked flask equipped with a stirrer, 54.1 g (270 mmol) of 1,4-bis(3-aminopropyl)piperazine, 26.2 g (594 mmol) of acetaldehyde, and 500 mL of tetrahydrofuran were added, and the mixture was stirred for 5 hours at room temperature. Then, 50.9 g (648 mmol) of acetyl chloride and 70.8 g (700 mmol) of triethylamine were slowly added thereto, and the resulting mixture was stirred for two hours. To the reaction mixture, 500 mL of sodium bicarbonate was added, and the resulting liquid was extracted 4 times with 800 mL of ethyl acetate. The obtained organic layer was washed with an aqueous solution of ammonium chloride, dried with magnesium sulfate, and then filtered. Thereafter, the solvent was distilled off under reduced pressure, thereby obtaining 33.6 g (100 mmol, yield: 37%) of specific polymerizable compound 14.

—Synthesis of Specific Polymerizable Compound 15—

To a 500-mL three-necked flask equipped with a stirrer, 23.8 g (200 mmol) of N-methyldiethanolamine and 148.6 g (2.8 mol) of acrylonitrile were added. Then, while cooling in an ice bath, 120 mg of potassium hydroxide were added thereto, and the resulting mixture was stirred for 10 hours. Then, the excess acrylonitrile was distilled off under reduced pressure. Thereafter, 600 mL of methylene chloride was added to the resulting residue, and the resulting liquid was filtered with Celite, and washed with 400 mL of methylene chloride. The obtained solution was washed with 400 mL of sodium bicarbonate, and the organic layer was dried over magnesium sulfate. Thereafter, methylene chloride was distilled off under reduced pressure, thereby obtaining 44.1 g (196 mmol, yield (crude): 98%) of a nitrile composition.

Next, to a two-liter three-necked flask equipped with a stirrer, 44.1 g (196 mmol) of the nitrile composition and 230 mL of tetrahydrofuran were added. Then, under a nitrogen atmosphere, 1200 mL (1.2 mol) of a 1 M solution of boron-tetrahydrofuran was added thereto dropwise over one hour. After the addition was completed, the mixture was stirred and heated under reflux for 5 hours. After cooling the resulting mixture to room temperature, a mixed solution of 350 mL of methanol and 76 mL of concentrated hydrochloric acid was slowly added thereto dropwise, and stirred for one hour at room temperature. Then, the organic solvent was distilled off under reduced pressure. To the obtained solution, 580 mL of a 2 N aqueous solution of sodium hydroxide were added, and the resulting liquid was extracted 6 times with 400 mL of methylene chloride. The obtained organic layer was dried over magnesium sulfate. Thereafter, methylene chloride was distilled off under reduced pressure, thereby obtaining 37.6 g (161 mmol, yield (crude): 82%) of an amine composition.

Next, to a one-liter three-necked flask equipped with a stirrer, 37.6 g (161 mmol) of the amine composition, 25.8 g (645 mmol) of sodium hydroxide, 300 mL of water, and 450 mL of acetonitrile were added. Then, while cooling in an ice bath, 30.6 g (338 mmol) of acrylic acid chloride was added thereto dropwise. After the addition was completed, the temperature of the mixture was elevated to room temperature, and the mixture was further stirred for 6 hours. Then, from the resulting reaction liquid, acetonitrile was distilled off under reduced pressure. Thereafter, the aqueous layer was extracted 5 times with ethyl acetate. The obtained organic layer was dried with magnesium sulfate, and then filtered. Thereafter, ethyl acetate was distilled off under reduced pressure, thereby obtaining 29.0 g (85 mmol, yield: 53%) of specific polymerizable compound 15.

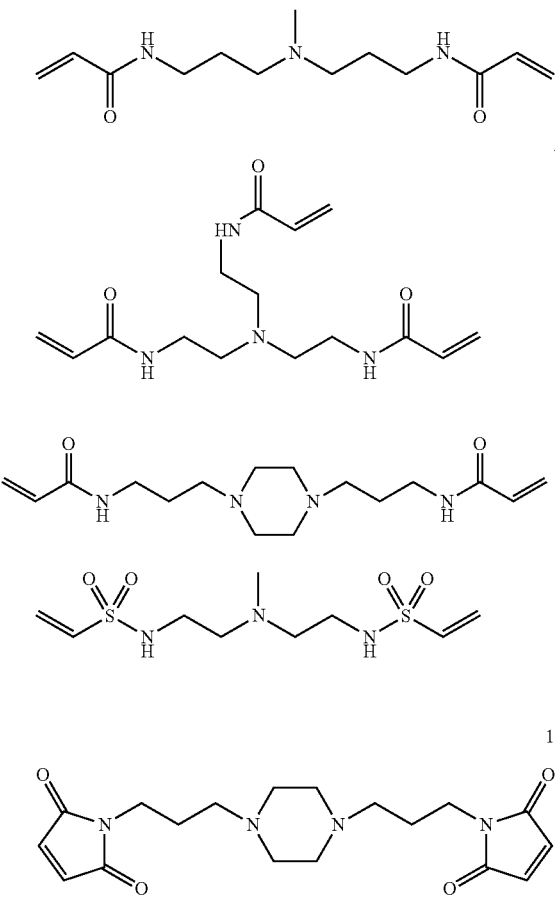

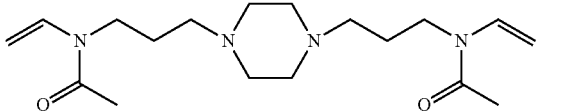

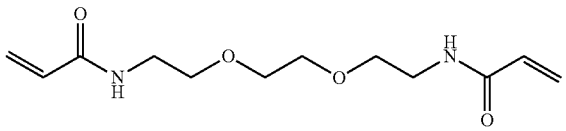

Comparative Polymerizable Compound 1

Comparative Polymerizable Compound 2

Example 1

[Preparation of Ink Set 1]

Cyan ink (C-1) according to Ink formulation 1, magenta ink (M-1), yellow ink (Y-1), black ink (K-1) and treatment liquid 1 were prepared by the following processes, and ink set 1 including these ink compositions and treatment liquid 1 was thus obtained.

(Preparation of Cyan Ink (C-1))

The resin-coated cyan pigment dispersion, ion exchanged water, an initiator, a polymerizable compound, and a surfactant were mixed to give Ink formulation 1 described below. Thereafter, the resulting mixture was filtered with a membrane filter having a pore size of 5 μm, thereby preparing cyan ink (C-1) of Ink formulation 1.

| Ink formulation 1 | |
|---|---|
| Resin-coated cyan pigment dispersion (solid matter content) | 6% |
| IRGACURE 2959 (trade name; initiator) | 3% |
| Specific polymerizable compound 3 | 10% |
| OLFINE E1010 (trade name, manufactured by Nissin Chemical Industry Co., Ltd.; surfactant) | 1% |
| Ion exchanged water | added to give 100% in total |

The pH (at 25° C.) of the cyan ink (C-1) measured using a pH meter (WM-50EG, trade name, manufactured by DKK-TOA Corporation) was 8.5.

(Preparation of Magenta Ink (M-1))

Preparation of magenta ink (M-1) was conducted in a manner substantially similar to the preparation of the cyan ink (C-1) described above, except that the resin-coated magenta pigment dispersion was used instead of the resin-coated cyan pigment dispersion used in the preparation of the cyan ink (C-1). The pH of the magenta ink (M-1) was 8.5.

(Preparation of Yellow Ink (Y-1))

Preparation of yellow ink (Y-1) was conducted in a manner substantially similar to the preparation of the cyan ink (C-1) described above, except that the resin-coated yellow pigment dispersion was used instead of the resin-coated cyan pigment dispersion used in the preparation of the cyan ink (C-1). The pH of the yellow ink (Y-1) was 8.5.

(Preparation of Black Ink (K-1))

Preparation of black ink (K-1) was conducted in a manner substantially similar to the preparation of the cyan ink (C-1) described above, except that the resin-coated black pigment dispersion was used instead of the resin-coated cyan pigment dispersion in the preparation of the cyan ink (C-1). The pH of the black ink (K-1) was 8.5.

(Preparation of Treatment Liquid 1)

The following materials were mixed to prepare treatment liquid 1. The pH (at 25° C.) of the treatment liquid 1 measured using a pH meter (WM-50EG, trade name, manufactured by DKK-TOA Corporation) was 1.0.

| Composition of Treatment Liquid | |
| --- | --- |
| Malonic acid | 25.0% |
| Tripropylene glycol monomethyl ether (water-soluble organic solvent) | 5.0% |
| Ion exchanged water | 70.0% |

Examples 2 to 7

Ink compositions C-2 to C-7, ink compositions M-2 to M-7, ink compositions Y-2 to Y-7, and ink compositions K-2 to K-7 were prepared in a manner substantially similar to Example 1, respectively, except that specific polymerizable compound 4, 5, 15, 6, 11 or 14 was used instead of specific polymerizable compound 3 used in Example 1.

Ink set 2 to ink set 7 were prepared using the ink compositions C-2 to C-7, M-2 to M-7, Y-2 to Y-7 and K-2 to K-7, and the treatment liquid 1, in a manner substantially similar to the preparation of the ink set 1 including the ink compositions C-1, M-1, Y-1 and K-1 and the treatment liquid 1.

Example 8

[Preparation of Ink Set 8]

Cyan ink (C-8) according to Ink formulation 8, magenta ink (M-8), yellow ink (Y-8), black ink (K-8) and the treatment liquid 1 were prepared according to the following processes, respectively, and ink set 8 including these ink compositions and the treatment liquid 1 was obtained.

(Preparation of Cyan Ink (C-8))

The resin-coated cyan pigment dispersion, ion exchanged water, an initiator, a polymerizable compound, and a surfactant were mixed to give Ink formulation 8 described below. Thereafter, the resulting mixture was filtered with a membrane filter having a pore size of 5 µm, thereby preparing cyan ink (C-8) of Ink formulation 8.

| Ink Formulation 8 | |
| --- | --- |
| Resin-coated cyan pigment dispersion (solid matter content) | 6% |
| IRGACURE 2959 (trade name; initiator) | 3% |
| Specific polymerizable compound 3 | 20% |
| OLFINE E1010 (trade name, manufactured by Nissin Chemical Industry Co., Ltd.; surfactant) | 1% |
| Ion exchanged water | added to give 100% in total |

The pH (at 25° C.) of the cyan ink (C-8) measured using a pH meter (WM-50EG, trade name, manufactured by DKK-TOA Corporation) was 8.5.

(Preparation of Magenta Ink (M-8))

Preparation of magenta ink (M-8) was conducted in a manner substantially similar to the preparation of the cyan ink (C-8) described above, except that the resin-coated magenta pigment dispersion was used instead of the resin-coated cyan pigment dispersion used in the preparation of the cyan ink (C-8). The pH of the magenta ink (M-8) was 8.5.

(Preparation of Yellow Ink (Y-8))

Preparation of yellow ink (Y-8) was conducted in a manner substantially similar to the preparation of the cyan ink (C-8) described above, except that the resin-coated yellow pigment dispersion was used instead of the resin-coated cyan pigment dispersion used in the preparation of the cyan ink (C-8). The pH of the yellow ink (Y-8) was 8.5.

(Preparation of Black Ink (K-8))

Preparation of black ink (K-8) was conducted in a manner substantially similar to the preparation of the cyan ink (C-8) described above, except that the resin-coated black pigment dispersion was used instead of the resin-coated cyan pigment dispersion used in the preparation of the cyan ink (C-8). The pH of the black ink (K-8) was 8.5.

Examples 9 and 10

Ink compositions C-9 and C-10, ink compositions M-9 and M-10, ink compositions Y-9 and Y-10, and ink compositions K-9 and K-10 were prepared in a manner substantially similar to Example 8, respectively, except that specific polymerizable compound 4 or 5 was used instead of specific polymerizable compound 3 used in Example 8. Ink sets 9 and 10 were prepared by using the treatment liquid 1 in combination, respectively.

(Preparation of Treatment Liquid 2)

The following materials were mixed to prepare treatment liquid 2. The pH (at 25° C.) of the treatment liquid 2 after adjusting the pH, measured using a pH meter (WM-50EG, trade name, manufactured by DKK-TOA Corporation), was 4.0.

| Composition of Treatment Liquid | |
| --- | --- |
| Polyethylene imine (cationic polymer) | 13.0% |
| Ion exchanged water | 87.0% |

(Preparation of Treatment Liquid 3)

The following materials were mixed to prepare treatment liquid 3. The pH (at 25° C.) of the treatment liquid 3 measured using a pH meter (WM-50EG, trade name, manufactured by DKK-TOA Corporation) was 4.0.

| Composition of Treatment Liquid | |
| --- | --- |
| Magnesium nitrate (polyvalent metal salt) | 15% |
| Diethylene glycol monoethyl ether | 4% |
| Surfactant A (described below, 10% aqueous solution) | 1% |
| Ion exchanged water | 80% |

(Preparation of Treatment Liquid 4)

The following materials were mixed to prepare treatment liquid 4. The pH (at 25° C.) of the treatment liquid 4 after adjusting the pH as measured using a pH meter (WM-50EG, trade name, manufactured by DKK-TOA Corporation) was 5.0.

| Composition of Treatment Liquid | |
|---|---|
| Poly(vinyl imidazole) (cationic polymer) | 13.0% |
| GP-250 (trade name; water-soluble organic solvent) | 10% |
| Surfactant A (described below, 10% aqueous solution) | 0.2% |
| Ion exchanged water | 76.8% |

Surfactant A

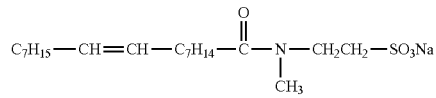

Comparative Example 1

Ink set C1 was prepared in a manner substantially similar to Example 1, except that comparative polymerizable compound 1 described above was used instead of specific polymerizable compound 3 in Example 1.

Comparative Example 2

Ink set C2 was prepared in a manner substantially similar to Example 1, except that comparative polymerizable compound 2 (polyethylene glycol diacrylate A-400, manufactured by Shin-Nakamura Chemical Co., Ltd.; n=8) was used instead of specific polymerizable compound 3 in Example 1.

Comparative Example 3

Ink set C3 was prepared in a manner substantially similar to Example 8, except that comparative polymerizable compound 1 was used instead of specific polymerizable compound 3 used in Example 8.

Comparative Example 4

Ink set C4 was prepared in a manner substantially similar to Example 8, except that comparative polymerizable compound 2 described above (polyethylene glycol diacrylate A-400, manufactured by Shin-Nakamura Chemical Co., Ltd.; n=8) was used instead of specific polymerizable compound 3 used in Example 8.

[Inkjet Image Formation]

An image was formed on a recording medium (coated paper, TOKUBISHI ART, trade name, weight: 104.7 g/m$^2$) in a manner as described below, and the obtained image was evaluated.

Specifically, a line image and a solid image were formed by four-color single pass recording using the ink sets 1 to 10, C1 and C4, respectively.

In this process, line images having widths of 1-dot, 2-dot and 4-dot were formed by ejecting the ink composition by single pass in the main scanning direction.

Solid images were formed by ejecting the ink composition onto the entire surface of a sample prepared by cutting the recording medium in an A5 size. The recording conditions were as follows.

(1) Treatment Liquid Applying Process

The treatment liquid was applied onto the whole surface of the recording medium by an anilox roller (having a line resolution of from 100 to 300 lines per inch) such that the application amount was controlled to be 1.4 g/m$^2$ with a roll coater.

(2) Treatment Process

Subsequently, the recording medium with the treatment liquid applied thereon was subjected to a drying treatment and a permeation treatment under the following conditions.

Wind velocity: 10 m/s

Temperature: the recording medium was heated using a contact-type plane heater, from the side of a surface of the recording medium opposite to a recorded surface such that the surface temperature of the recording medium on the recorded side was 60° C.

(3) Ink Applying Process

Thereafter, the ink composition was ejected onto the surface of the recording medium onto which the treatment liquid had been applied, in accordance with an inkjet system under the following conditions, thereby forming a line image and a solid image.

Heads: piezo full line heads with 1,200 dpi/20 inch width for four colors were used.

Amount of ejection of liquid droplets: 2.0 pL

Driving frequency: 30 kHz (4) Ink Drying Process

Subsequently, the recording medium onto which the ink composition had been applied was dried under the following conditions.

Drying method: air blow drying

Wind velocity: 15 m/s

Temperature: the recording medium was heated using a contact-type plane heater from the side of a surface of the recording medium opposite to the recorded side, such that the surface temperature of the recording medium on the recorded side was 60° C.

(5) Actinic Energy Ray Irradiating Process

Next, the obtained images were exposed to ultraviolet rays as actinic energy rays using a high-pressure mercury lamp (output power: 120 W/cm$^2$) at an energy amount of 750 mJ/cm$^2$. Samples for evaluation on which images were formed were thus obtained.

[Evaluation]

Using the obtained samples for evaluation, an ink curing sensitivity test was performed in the following manner. The results are shown in Table 1.

(Curing Sensitivity)

A paper weight (weight: 470 g, size: 15 mm×30 mm×120 mm) with a sheet of unprinted coated paper (TOKUBISHI ART DOUBLE-SIDED N, trade name, manufactured by Mitsubishi Paper Mills, Ltd.) wrapping around the paper weight was used to rub a surface of the sample for evaluation on which a solid image had been formed in a back-and-forth manner three times (equivalent to a load of 260 kg/m$^2$). The area at which the unprinted coated paper contacted the sample was 150 mm$^2$. The printed surface after being rubbed was visually observed, and evaluated in accordance with the following criteria.

—Evaluation Criteria—

A: Peeling in the image (coloring material) in the printed surface was not visually detected.

B: A slight degree of peeling in the image (coloring material) in the printed surface was detected.

C: Peeling in the image (coloring material) which was not acceptable in practical applications was visually detected.

TABLE 1

| Ink Set | No. | Specific Polymerizable Compound | Content (%) | Curing Sensitivity |
|---|---|---|---|---|
| Example 1 | 1 | Specific Polymerizable Compound 3 | 10 | A |
| Example 2 | 2 | Specific Polymerizable Compound 4 | 10 | A |
| Example 3 | 3 | Specific Polymerizable Compound 5 | 10 | A |
| Example 4 | 4 | Specific Polymerizable Compound 15 | 10 | A |
| Example 5 | 5 | Specific Polymerizable Compound 6 | 10 | B |
| Example 6 | 6 | Specific Polymerizable Compound 11 | 10 | B |
| Example 7 | 7 | Specific Polymerizable Compound 14 | 10 | B |
| Example 8 | 8 | Specific Polymerizable Compound 3 | 20 | A |
| Example 9 | 9 | Specific Polymerizable Compound 4 | 20 | A |
| Example 10 | 10 | Specific Polymerizable Compound 5 | 20 | A |
| Comparative Example 1 | C1 | Comparative Polymerizable Compound 1 | 10 | C |
| Comparative Example 2 | C2 | Comparative Polymerizable Compound 2 | 10 | C |
| Comparative Example 3 | C3 | Comparative Polymerizable Compound 1 | 20 | C |
| Comparative Example 4 | C4 | Comparative Polymerizable Compound 2 | 20 | C |

As is evident from Table 1, all of the ink compositions of the present invention exhibited excellent curing sensitivity.

Further, the line images formed from the ink compositions of the present invention and the treatment liquid 1 exhibited excellent image quality.

Moreover, when the same evaluation was performed while using any of the treatment liquid 2 to 4 instead of the treatment liquid 1, an image having excellent curing sensitivity and excellent image quality was formed similar to the case in which the treatment liquid 1 was used.

Further, when the evaluation was performed while using "OK TOPCOAT+" (trade name, weight: 104.7 g/m$^2$) or U-LITE (trade name, weight: 104.7 g/m$^2$) instead of TOKUBISHI ART (trade name; weight: 104.7 g/m$^2$) as a recording medium, an image having excellent curing sensitivity and excellent image quality was formed similar to the case in which TOKUBISHI ART (trade name) was used.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising a polymerizable compound represented by following Formula (1), a polymerization initiator and water:

$$X\text{-}(A)_n \qquad \text{Formula (1)}$$

wherein, in Formula (1), X represents a divalent or trivalent nitrogen-containing linking group represented by any one of following Formulae (X1) to (X3), A represents a polymerizable functional group having an amino group, and n represents 2 or 3:

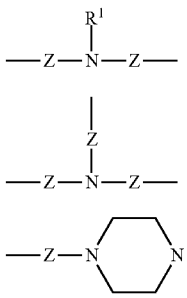

Formula (X1)

Formula (X2)

Formula (X3)

wherein, in Formulae (X1) to (X3), Z independently represents an alkylene group having 2 or 3 carbon atoms, or a divalent linking group consisting of one or two alkyleneoxy groups each having 2 or 3 carbon atoms and an alkylene group having 2 or 3 carbon atoms; and R$^1$ represents a hydrogen atom or an alkyl group having 1 to 4 carbon atoms.

2. The ink composition according to claim 1, wherein the polymerizable functional group represented by A is any one of following Formulae (A1) to (A4):

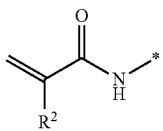

Formula (A1)

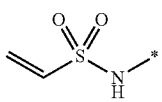

Formula (A2)

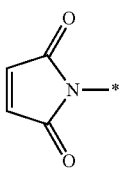

Formula (A3)

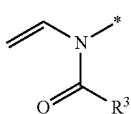

Formula (A4)

wherein, in Formulae (A1) to (A4), R$^2$ represents a hydrogen atom or an alkyl group, R$^3$ represents an alkyl group or an aryl group, and * represents a site to be bonded to the nitrogen-containing linking group represented by X.

3. The ink composition according to claim 2, wherein the polymerizable functional group represented by A is represented by Formula (A1).

4. The ink composition according to claim 1, further comprising a pigment.

5. The ink composition according to claim 1, wherein the polymerization initiator is a photopolymerization initiator.

6. An ink set comprising the ink composition according to claim 1 and a treatment liquid capable of forming an aggregation by contacting the aqueous ink composition.

7. The ink set according to claim 6, wherein the treatment liquid comprises at least one of an acidic compound, a polyvalent metal salt or a cationic polymer.

8. An image forming method comprising:
applying the treatment liquid included in the ink set according to claim 6 onto a recording medium; and
applying the ink composition included in the ink set onto the recording medium to form an image.

9. The image forming method according to claim 8, wherein the recording medium is coated paper.

10. The image forming method according to claim 8, wherein the ink composition is applied onto the recording medium to which the treatment liquid has been applied.

11. The image forming method according to claim 8, wherein the ink composition is applied by an inkjet method.

* * * * *